(12) United States Patent
Fisher et al.

(10) Patent No.: US 8,116,909 B2
(45) Date of Patent: Feb. 14, 2012

(54) GANTRY POSITION TRACKING USING REDUNDANT POSITION SENSORS

(75) Inventors: Lance K. Fisher, Excelsior, MN (US);
Namir Sayegh, Minneapolis, MN (US);
John D. Gaida, Victoria, MN (US)

(73) Assignee: CyberOptics Corporation, Golden Valley, MN (US)

( * ) Notice: Subject to any disclaimer, the term of this patent is extended or adjusted under 35 U.S.C. 154(b) by 567 days.

(21) Appl. No.: 12/345,967

(22) Filed: Dec. 30, 2008

(65) Prior Publication Data
US 2009/0165580 A1    Jul. 2, 2009

Related U.S. Application Data

(60) Provisional application No. 61/009,800, filed on Jan. 2, 2008.

(51) Int. Cl.
*G06F 19/00* (2006.01)
(52) U.S. Cl. .................. 700/245; 700/259
(58) Field of Classification Search .......... 700/245–264; 318/568; 901/1–50
See application file for complete search history.

(56) References Cited

U.S. PATENT DOCUMENTS

| | | | |
|---|---|---|---|
| 6,157,157 A | 12/2000 | Prentice et al. | 318/625 |
| 6,294,755 B1 | 9/2001 | Sawatzky et al. | 219/121.72 |
| 2004/0178327 A1 | 9/2004 | Widdowson et al. | 250/221 |
| 2007/0158401 A1 | 7/2007 | Katoh et al. | 235/375 |

FOREIGN PATENT DOCUMENTS
WO    WO 00/60425    10/2000

OTHER PUBLICATIONS

International Search Report and Written Opinion for patent application No. PCT/US2008/088544, dated Jul. 21, 2009.

*Primary Examiner* — Mary Cheung
(74) *Attorney, Agent, or Firm* — Christopher R. Christenson; Westman, Champlin & Kelly, P.A.

(57) ABSTRACT

An x-y robotic motion control system includes a controller, a first rail and a second rail spaced from the first rail wherein the first and second rails are substantially parallel to one another. A gantry has a first end movable along the first rail and a second end movable along the second rail. A payload is movable along the gantry and a position sensor is movable along the gantry with the payload. A first encoder is configured to detect the first end of the gantry with respect to the first rail, and a second encoder is configured to detect the second end of the gantry with respect to the second rail. The position sensor and the first and second encoders are coupled to the controller, which calculates a position of the payload as a function of signals from the position sensor and the first and second encoders.

4 Claims, 2 Drawing Sheets

GANTRY POSITION TRACKING USING REDUNDANT POSITION SENSORS

CROSS-REFERENCE TO RELATED APPLICATION

The present application is based on and claims the benefit of U.S. provisional patent application Ser. No. 61/009,800, filed Jan. 2, 2008, the content of which is hereby incorporated by reference in its entirety.

COPYRIGHT RESERVATION

A portion of the disclosure of this patent document contains material which is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND

Many robotic systems utilize robotic x, y tables or gantries. Often, the robotic system is driven in the x direction by a first motor or actuator, and driven in an orthogonal, or y, direction by a second motor or actuator. Typically, such robotic systems include encoders or position sensors that sense movement in the x and y directions for closed-loop feedback of the associated drive motors. In this sense, the robotic system is movable in a closed-loop feedback control system in both x and y axis in order to perform a given function.

Providing a robotic x, y system, with enhanced position measurement precision would allow for finer motion control in such applications.

SUMMARY

An x-y robotic motion control system includes a controller, a first rail and a second rail spaced from the first rail wherein the first and second rails are substantially parallel to one another. A gantry has a first end movable along the first rail and a second end movable along the second rail. A payload is movable along the gantry and a position sensor is movable along the gantry with the payload. A first encoder is configured to detect the first end of the gantry with respect to the first rail, and a second encoder is configured to detect the second end of the gantry with respect to the second rail. The position sensor and the first and second encoders are coupled to the controller, which calculates a position of the payload as a function of signals from the position sensor and the first and second encoders.

DETAILED DESCRIPTION OF ILLUSTRATIVE EMBODIMENTS

Those skilled in the art will recognize that embodiments of the present invention apply to any robotic system that employs two orthogonal axes where a payload or object of the system is independently moveable in the orthogonal axes and where a gantry or beam is used that is driven on a single end of the beam.

Figure 1:
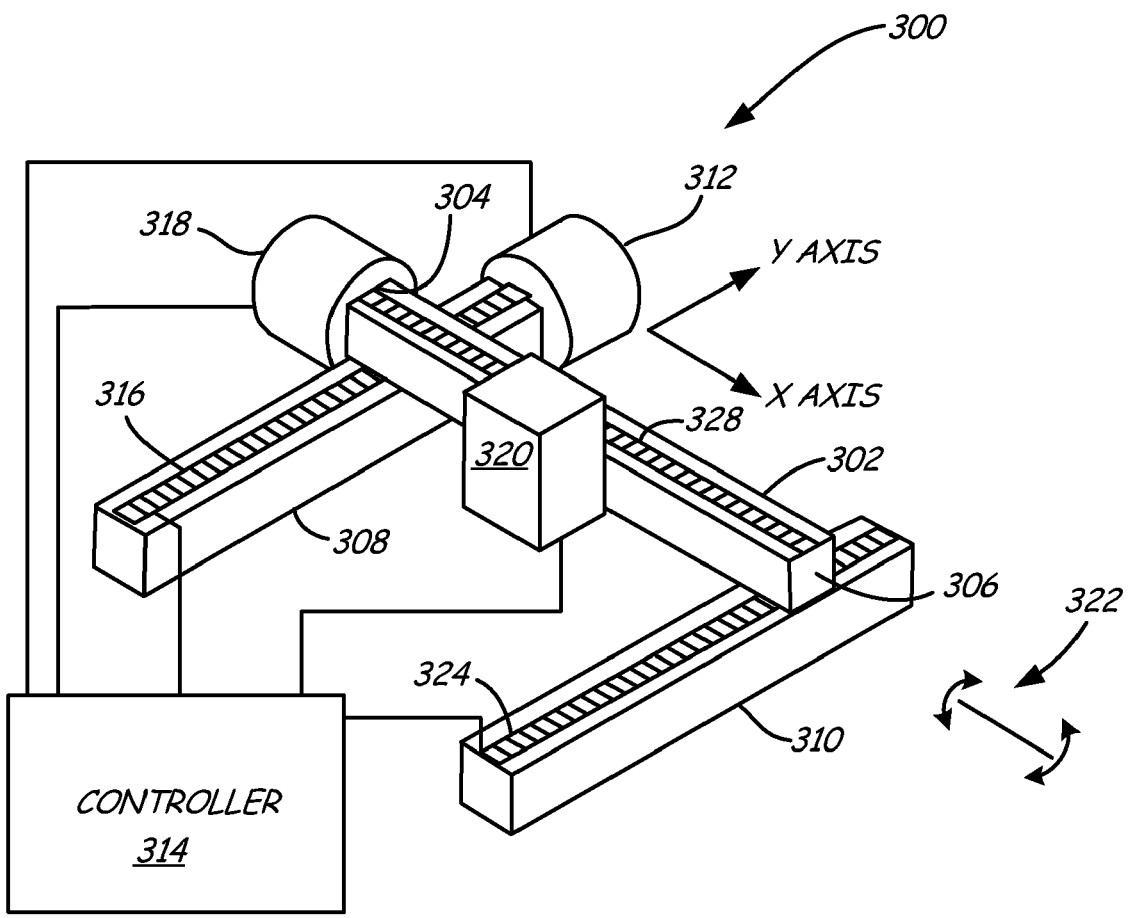
FIG. 1 is a simplified diagrammatic view of an x, y gantry in accordance with an embodiment of the present invention.

FIG. 1 is a simplified diagrammatic view of an x, y gantry in accordance with an embodiment of the present invention. System 300 includes a gantry or beam 302 having a first end 304 and a second end 306. Each of ends 304, 306 is arranged to move along rails or mounts 308, 310, respectively. Beam or gantry 302 is typically driven in the y axis by actuator or motor 312 coupled to a worm gear, or other suitable structure that drives end 304 of beam 302 with rotation of motor 312. Motor 312 operates under the control of controller 314 which receives position feedback from first encoder 316. Accordingly, as motor 312 rotates and urges end 304 of gantry 302 in the y axis, the y-axis motion of gantry 302 will be transduced, or otherwise measured, by encoder 316 that provides such feedback to controller 314 for closed-loop motion control. Similarly, x-axis actuator 318 is also preferably coupled to a worm gear, or similar structure that causes displacement of sensor/payload 320 along the x axis when motor 318 operates under the control of controller 314. Payload 320 is coupled to encoder 328, or other suitable sensor, that generates a signal to controller 314 based upon x-axis motion or position. Accordingly, controller 314 is able to discern x and y axis positions of payload 320 based upon signals from encoder 328 and y-axis encoder 316 to suitably control motors 312 and 318 to generate motion.

As illustrated in FIG. 1, payload 320 is disposed on gantry 302 where the y-axis motion is controlled from one side (side 304 of gantry 302) and may be controlled to insufficient accuracy for some applications due to inevitable yaw in the y axis. For example, as motor 312 engages and accelerates payload block 320 to a specified y-axis position, first side 304 of gantry 302 may be moved further toward the selected y position than the non-driven side 306 of gantry 302. This can generate a yaw-error as illustrated diagrammatically at reference numeral 322. Moreover, if there is any backlash or irregularities in the mechanical system, this yaw-error may remain even once motion is ceased at the selected position. While it could conceivably be possible to mitigate this error to some extent by driving both sides 304 and 306 of gantry 302 with motors, such a solution would require an additional motor and potentially a second encoder to control the second motor as well as additional motion control complexity to ensure that both motors operate in complete synchronicity and do not stress the mechanical system. Such additional hardware and/or complexity is not desired. Instead, in accordance with an embodiment of the present invention, a second y-axis encoder is employed on second mount or rail 310, as illustrated at reference numeral 324. The second y-axis encoder is also coupled to controller 314.

Controller 314 is configured to combine the position signals of encoders 316 and 324, where each of the y-axis encoders is disposed on opposite side mounts of gantry 302. Controller 314 calculates the y-axis position of payload 320 based on interpolated position using signals from both encoders 316 and 324. Preferably, controller 314 calculates the computed position of payload 320 based upon a weighted average of the two y-axis encoder position signals where the weighting is based upon the signal from encoder 328 itself. For example, if encoder 328 indicates that its x-axis position is disposed precisely halfway between mounts 308 and 310, the weighting of the y-axis encoder signals 316 and 324 will be equal to one another. However, if encoder 328 indicates that it is closer to mount 308, then the signal of y-axis encoder 316 will be given greater weight than that of encoder 324. Preferably, a pair of encoder counters (one for each y-axis encoder input Y and Y') track the position of each end 304, 306 of gantry 302 on mounts or rails 308, 310. Encoder 328 may include an encoder counter that tracks the position of payload along the x-axis and (as described above) is used for the weighting factor. The weighting factor function is preferably computed as follows:

$$(\text{weighting factor})=X/L,$$

where X is the distance from side 304 to payload 320 and L is the x-axis fixed distance between mounts 308 and 310.

The interpolated y-axis position of payload 320 is computed as follows:

$$\text{position}=Y+(\text{weighting factor}*(Y'-Y)).$$

While the functions given above are preferred, other calculations can be used to provide an improved y-axis position based on the two y-axis position signals. For example, if the weighting factor is below a selected threshold, a y-axis position from a first encoder would be used, while the second y-axis sensor signal could be used if the weighting factor is above the threshold. Those skilled in the art will appreciate that other calculations can be used to practice embodiments of the present invention as well.

While encoders 316, 324 and 328 have been illustrated diagrammatically as linear encoder counters, any suitable encoders that are able to translate motion and/or position into a suitable electronic signal that is useable by controller 314 can be used. Accordingly, each of encoders 316, 324 and 328 could be rotary encoders coupled to an element that rotates with translation in the motion axis.

Figure 2:
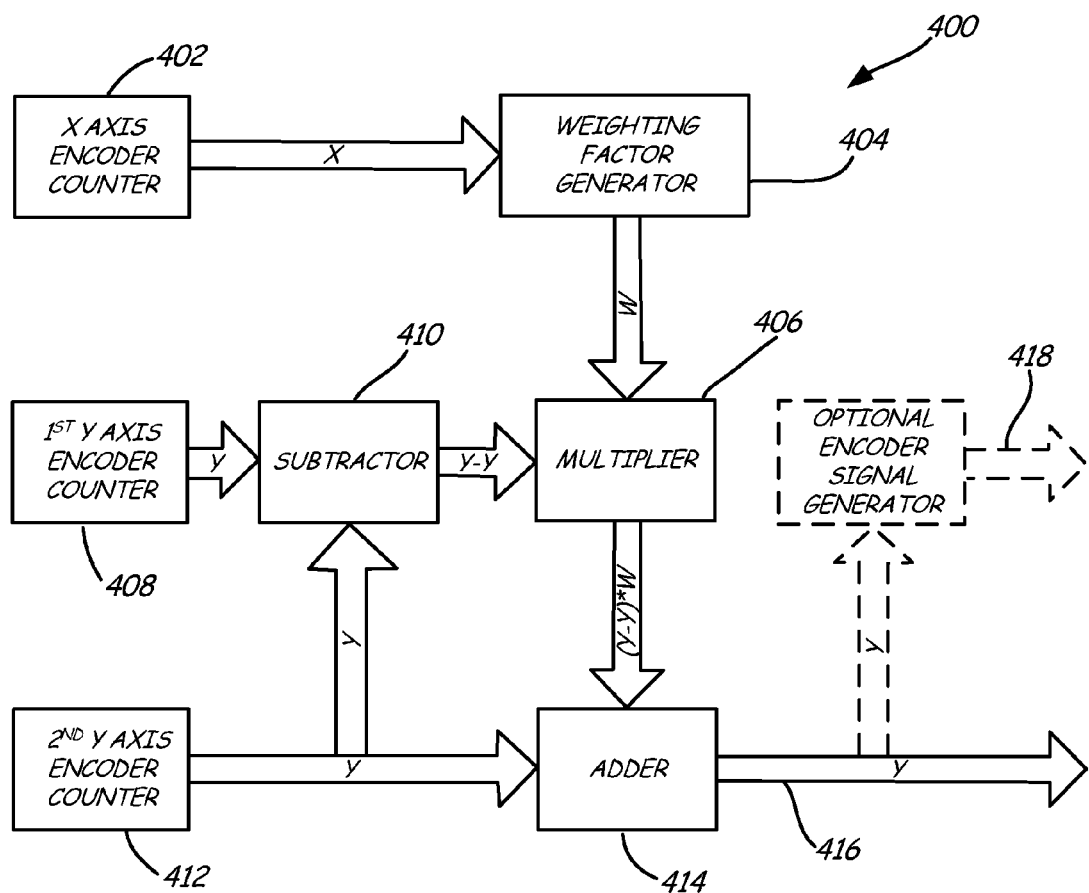
FIG. 2 is a flow diagram of a method of calculating a position of a payload of an x, y robotic system in accordance with an embodiment of the present invention.

FIG. 2 is a flow diagram of a method of calculating a position of a payload of an x, y robotic system in accordance with an embodiment of the present invention. Method 400 can be computed in any suitable manner, including calculated manually, but is preferably implemented using controller 314 illustrated with respect to FIG. 2. In method 400, x-axis encoder or counter signal is acquired from a suitable sensor, such as encoder 328 as illustrated at block 402. The signal (X) from block 402 is conveyed to weighting factor generator block 404 which calculates a weight (W) that is conveyed to multiplier block 406. At block 408, a first y-axis encoder counter signal is obtained from a first side of a gantry, which is conveyed as signal Y' to subtractor block 410. Similarly, at block 412, a second y-axis encoder signal is obtained from an encoder disposed at an opposite side of the gantry. The signal from block 412 is conveyed (as Y) to subtractor block 410 and adder block 414 as illustrated. Subtractor block 410 generates an output to multiplier block 406 that equals Y'-Y. That quantity is multiplied in multiplier block 406 by the weighting factor generated by block 404. The output of multiplier block 406 is conveyed to adder 414. Accordingly, the output 416 of Y" equals Y+((Y'-Y)*W). Optionally, Y" can be fed to an encoder signal generator which can provide a signal output based upon Y" illustrated at reference numeral 418. This output Y" or the signal generated from Y" can be used by controller 314 as a feedback signal for more effective motion control of payload 320.

Although the present invention has been described with reference to preferred embodiments, workers skilled in the art will recognize that changes may be made in form and detail without departing from the spirit and scope of the invention.

What is claimed is:

1. An x-y robotic motion control system comprising:
   a controller;
   a first rail;
   a second rail spaced from the first rail wherein the first and second rails are substantially parallel to one another;
   a gantry having a first end movable along the first rail and a second end movable along the second rail;
   a first motor operably coupled to one of the first and second rails to displace the gantry along the one of the first and second rails, wherein the first motor is operably coupled to the controller;
   a payload movable along the gantry;
   a position sensor disposed to measure the position of the payload along the gantry;
   a first encoder configured to detect the first end of the gantry with respect to the first rail;
   a second encoder configured to detect the second end of the gantry with respect to the second rail; and
   wherein the position sensor and the first and second encoders are coupled to the controller and wherein the controller is configured to calculate a position of the payload as a function of signals from the position sensor and the first and second encoders.

2. The x-y robotic motion control system of claim 1, and further comprising a second motor coupled to the gantry to displace the payload along the gantry, wherein the second motor is operably coupled to the controller.

3. An x-y robotic motion control system comprising:
   a controller;
   a first rail;
   a second rail spaced from the first rail wherein the first and second rails are substantially parallel to one another;
   a gantry having a first end movable along the first rail and a second end movable along the second rail;
   a payload movable along the gantry;
   a position sensor disposed to measure the position of the payload along the gantry;
   a first encoder configured to detect the first end of the gantry with respect to the first rail;
   a second encoder configured to detect the second end of the gantry with respect to the second rail;
   wherein the position sensor and the first and second encoders are coupled to the controller and wherein the controller is configured to calculate a position of the payload as a function of signals from the position sensor and the first and second encoders; and
   wherein the function is a weighted combination of the first and second encoder signals, wherein the weighting is based upon a signal from the position sensor.

4. The x-y robotic motion control system of claim 3, wherein the weight is multiplied by the difference between the first and second encoder signals.

* * * * *